June 10, 1958 KAZUHIKO AKASHI 2,837,968
KNIFE-EDGES INSERTED IN THE MICROMETER
OCULAR OF A MICROSCOPE
Filed Sept. 26, 1956
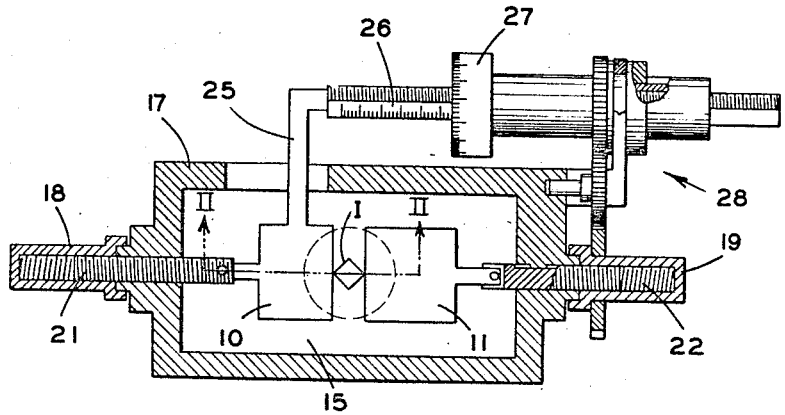
fig. 1
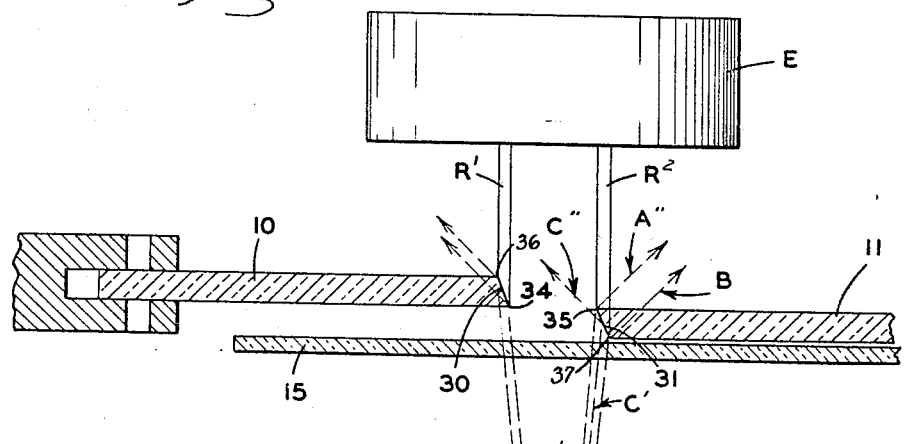
fig. 2
fig. 3
INVENTOR.
KAZUHIKO AKASHI
BY
Woodhams Blanchard & Flynn
ATTORNEY

United States Patent Office 2,837,968
Patented June 10, 1958

2,837,968

KNIFE-EDGES INSERTED IN THE MICROMETER OCULAR OF A MICROSCOPE

Kazuhiko Akashi, Tokyo, Japan, assignor to Akashi Seisakusho, Ltd., Tokyo, Japan, a corporation of Japan Application September 26, 1956, Serial No. 612,226

2 Claims. (Cl. 88—39)

This invention relates to an improvement in the ocular portion of an optical measuring instrument and more particularly relates to an improved ocular portion for a microscope attached to a diamond-pyramid type hardness tester wherein the index marks for measuring the length of the indentation in the test piece are more distinct and wherein the field of vision of the viewer is clearer. This application is a continuation-in-part of my co-pending application Serial No. 368,169, now abandoned.

The oldest and most commonly used index mark in the ocular portion of a microscope is a hair line. This hair line is usually obtained by scratching a glass plate with a diamond point. The edges of such a scratch mark will appear irregular under high magnification and consequently test readings based on such a scratch mark tend to be somewhat inaccurate and difficult to make. In other prior constructions metal plates having knife edges are used to provide index marks. While this construction gives rather distinct index marks, it suffers from the serious disadvantage that the viewer's field of vision is entirely dark except in the region between the knife edges. Where repeated readings are to be taken, for instance where the diamond-pyramid type hardness tester is used to determine the hardness of various portions of a series of test pieces, this causes serious eye strain of the viewer and thereby detrimentally affects the accuracy of the test results. Furthermore, these opaque plates block from view any part of the image which they overlap, thereby making it impossible to judge the distance which the plates must be backed off to uncover the image. Thus, if an overlap occurs, the plates must be backed off an excess distance to assure no overlap and this consumes additional time.

While it is possible to substitute transparent plates for the metal plates referred to previously, in order to give a clear field of vision over the test piece, if the edges of these transparent plates are perpendicular a number of serious disadvantages result. If the distance between these edges defining the index marks is very small, the edges will not be clearly visible. As this distance becomes wider, the light coming from below these edges will be refracted thereby resulting in a visible glittering of the edges. This makes the edges of the plates, and therefore the index marks, appear indistinct.

It has previously been suggested to bevel the opposing edges of a pair of co-planar transparent plates, with the bevel edges being away from the source of light so as to refract away all light which falls on them. While this construction effectively prevents glittering of the edges, it is subject to another serious disadvantage in that it is difficult to test such a device to establish that the corners of the beveled edges defining the index marks are perfectly parallel which is an essential characteristic of this type of device. The parallelism of the corners is tested by moving the edges toward each other until the corners just meet. If the corners are perfectly parallel, the diameter of the light passageway therebetween will be uniform along the entire length thereof. However, if the corners are not parallel, it frequently happens during the parallelism measurement that the corners are advanced too far and actually forced into contact with each other. Where the transparent plates are made of glass or quartz, the fragile corners are frequently chipped or cracked as a result of the forcible contact. Further, if the parallelism measurement is to be completely accurate the corners of the beveled edges which define the index marks must be brought together in substantially the same plane.

Accordingly, it is an object of this invention to provide an improved construction for the ocular portion of an optical measuring instrument.

It is a further object of this invention to provide an improved ocular portion of an optical measuring instrument, as aforesaid, wherein the index marks are distinct.

It is a further object of this invention to provide an improved ocular portion of an optical measuring instrument, as aforesaid, wherein the viewer's field of vision is much lighter than with conventional constructions in order to relieve eye strain of the viewer.

It is a further object of this invention to provide an improved ocular portion of an optical measuring instrument, as aforesaid, including a pair of transparent plates having beveled edges, said edges having corners which define the index marks of the instrument.

It is a further object of this invention to provide an improved ocular portion of an optical measuring instrument as aforesaid, in which the corners defining the index marks may be accurately measured for parallelism without risk of damage to said corners.

Other objects and advantages of the invention will become apparent to those acquainted with equipment of this type upon reading the following description and inspecting the accompanying drawings, in which:

Figure 1 is a schematic plan view of the ocular portion of a measuring microscope including means for adjusting same.

Figure 2 is a schematic sectional view of the microscope taken along the line II—II of Figure 1 and illustrating the manner in which light rays are reflected from the test piece to the ocular portion of the microscope.

Figure 3 is a reproduction on an enlarged scale of what is seen through the eyepiece of the microscope.

In meeting the objects and purposes above set forth as well as other objects related thereto, there is provided, in general, a pair of transparent plates 10 and 11 in the ocular portion of the microscope. The inward edges of plates 10 and 11 are beveled so that light rays impinging thereon are reflected and refracted thereby. The reflection and refraction of the light rays causes the viewer to see two relatively dark bands having sharply defined edges, which bands serve as the indexing marks.

Detailed description

In Figure 1, there is schematically illustrated the ocular portion of a microscope. The microscope includes a glass image plate 15 upon which an image I appears. In this embodiment the image I is of an indentation made in a test piece T by a diamond-pyramid type hardness tester of the so-called "Vickers" type. As schematically shown in Figure 2, the test piece T is illuminated by a source of light (not shown) and the reflected rays are transmitted in any conventional manner to the image plate 15.

The ocular portion of the microscope includes a housing 17. A pair of internally threaded sleeves 18 and 19 are secured to the housing 17 on opposite sides thereof for rotation relative thereto but in longitudinally nonmoving position on the housing. Threaded rods 21 and 22 engage the sleeves 18 and 19, respectively, and are mounted in the housing for longitudinal movement relative thereto. The rods 21 and 22 are adapted to be moved inwardly and outwardly of the housing when the sleeves are rotated relative to the housing. The rods 21 and 22 are keyed to the housing so that they do not rotate relative to the housing but only move longitudinally thereof. The plates 10 and 11 are secured to rods 21 and 22, respectively, and are adapted to be moved toward and away from each other by said rods.

An arm 25 is connected to plate 10 and is provided with a micrometer scale 26. A micrometer wheel 27 is movably mounted on the scale 26 and is adapted to be moved therealong in response to rotation of sleeve 19 by the linkage generally indicated at 28.

Referring to Figure 2, plate 10 is offset from plate 11 in the direction of the eyepiece E a distance substantially equal to the thickness of plate 11. The adjacent edges of these plates are beveled to form inclined, parallel faces 30 and 31 for purposes which will appear hereinafter. The angle of inclination of the faces may be varied within limits but must always be sufficient that glittering of the edges is avoided. Preferably the angle of inclination is such that substantially all light coming from below the transparent plates is totally refracted or bent. Variation in the angle of inclination will cause variation in the thickness of the band as described in more detail hereinbelow. Likewise the thickness of the transparent plate and the refractive index of the material of which it is composed will affect the width of the band.

The adjacent edges 34 and 35 of faces 30 and 31 define the index marks for the measuring operation and are virtually co-planar. However, plates 10 and 11 may be moved toward each other and into overlapping relationship without edges 34 and 35 contacting each other. The faces 30 and 31 have remote edges 36 and 37 which define the outer edge of the bands.

An eyepiece E is provided whereby the image plate 15 and transparent plates 10 and 11 may be viewed. The eyepiece provides a field of vision F as indicated in Figure 3.

*Operation*

Light rays from the light source will be reflected from the test piece T as rays A', B' and C'. Rays A' and B' upon striking the inclined face 31 of transparent plate 11 will be refracted as ray A'' and B''. Ray C' will be reflected from the beveled edge toward the other transparent plate. Other light rays from the light source will travel in substantially similar paths. The reflected and refracted rays serve to further illuminate the remainder of the viewer's field of vision. Thus, as shown in Figure 3, the entire field of vision through the eyepiece E will be well illuminated and consequently eye strain on the viewer will be considerably reduced.

In the regions $R^1$ and $R^2$ directly above the inclined faces 30 and 31 little or no light will be received due to the reflection and refraction of the light rays. The viewer will see these regions as relatively dark bands $B^1$ and $B^2$ when looking through the eyepiece. The inner edges of bands $B^1$ and $B^2$ will serve as the index marks for the measuring operation.

In measuring the image I with the apparatus of Figure 1, the right hand edge of the transparent plate 10 and band $B^1$ is brought to the left hand corner of the image by manipulating the sleeve 18. Such movement of plate causes movement of micrometer scale 26 and thus determines the zero point for the measurement. This procedure is repeated with sleeve 19 until the left hand edge of the transparent plate 11 and band $B^2$ touches the right hand corner of image I. Such movement of plate 11, causes corresponding movement of the micrometer wheel 27 due to linkage 28 between sleeve 19 and said micrometer wheel. The reading of the micrometer wheel and scale will then give the dimension of the indentation.

In this manner, repeated determinations can be made by a viewer with great speed. The adjacent edges 34 and 35 of the inclined faces 30 and 31 of plates 10 and 11 give sharp lines of demarcation and insure accurate determination because of the contrast between the bands $B^1$ and $B^2$ and the well lighted field of vision of the viewer. The elimination of eye strain of the viewer further insures accuracy by reducing the likelihood of human error.

The transparent plates 10 and 11 may be made of glass, quartz, plastic or like material.

In measuring the parallelism of edges 34 and 35, the plates 10 and 11 will be brought toward each other until the edges 34 and 35 appear to meet. If because of careless manipulation or non-parallelism, the plates 10 and 11 should be moved into overlapping relationship, the corners 34 and 35 will not contact and therefore said corners will not chip or crack. Because of the closely adjacent location of edges 34 and 35, extremely accurate parallelism measurements may be effected.

Although the above mentioned drawings and description refer to one particular, preferred embodiment of the invention, it is not my intention, implied or otherwise, to eliminate other variations or modifications of the invention unless specifically stated to the contrary in the hereinafter appended claims.

I claim:

1. In an optical measuring instrument, the combination including: an ocular focused on an image plane which receives the image of the object to be measured; a pair of parallel, flat, transparent plates positioned adjacent and parallel to said image plane and means mounting said plates for movement in their own planes toward and away from each other, one of said planes being offset from the other a distance at least as great as the thickness of said other plate, said plates having opposed end faces inclined in the same direction with respect to the planes of said plates, said end faces each having an edge adjacent the other plate and an edge remote from the other plate, the adjacent edges of said end faces being closer together in the direction parallel with the planes of said plates than the remote edges thereof.

2. An instrument as defined in claim 2 wherein said plates are offset from one another a distance only slightly greater than the thickness thereof so that said adjacent edges lie closely adjacent each other and may move into overlapping relationship without contact therebetween.

References Cited in the file of this patent

UNITED STATES PATENTS 1,918,556      Pfau ------------------ July 18, 1933

OTHER REFERENCES

Textbooks of Physical Chemistry, Spectroscopy by Baly, Longmans, Green and Co., New York, 1924, pages 44 and 45.